United States Patent [19]
Gauld

[11] Patent Number: 4,744,894
[45] Date of Patent: May 17, 1988

[54] FIBROUS STOCK SCREENING APPARATUS

[76] Inventor: W. Thomas Gauld, 4313 Winding Way, Mobile, Ala. 36609

[21] Appl. No.: 880,552

[22] Filed: Jun. 30, 1986

[51] Int. Cl.⁴ .......................... B07B 9/00; B07B 1/20
[52] U.S. Cl. .................................. 209/234; 209/273; 209/306; 209/389
[58] Field of Search .............. 209/234, 271, 273, 306, 209/379, 389, 415, 305, 385, 270

[56] References Cited

U.S. PATENT DOCUMENTS

| | | | |
|---|---|---|---|
| 4,213,823 | 7/1980 | Wittig et al. | 210/415 |
| 4,234,417 | 11/1980 | Gauld et al. | 209/306 |
| 4,374,728 | 2/1983 | Gauld | 209/306 |
| 4,396,502 | 8/1983 | Justus | 209/306 |
| 4,462,901 | 7/1984 | Gauld | 209/306 |

Primary Examiner—Joseph F. Peters, Jr.
Assistant Examiner—Stephen P. Avila
Attorney, Agent, or Firm—Walker & McKenzie

[57] ABSTRACT

A dam is used to divide the typical single screen of a fibrous stock screening apparatus into two primary screening zones. Stock inlet and rejects outlet ports are routed to each primary screening zone. The screen is extended past the typical rotor to create an initial screening zone. One or more of the blades of the rotor may also be extended to create turbulence and/or oscillating pressures in the initial screening zone. The profile of the blades may be designed to produce a shearing action with a long moderate relief on the trailing edge to create gradual and extended negative pressure.

7 Claims, 3 Drawing Sheets

FIBROUS STOCK SCREENING APPARATUS

BACKGROUND OF THE INVENTION

1. Field of the Invention

The present invention relates in general to means for separating various size debris from a pulp slurry under pressure.

2. Description of the Related Art

Gauld et al, U.S. Pat. No. 4,234,417 discloses a fibrous stock screening apparatus including a rotor having a cylindrical body member and a plurality of blade members attached to the body member with the leading edge of each blade member spaced farther from the body member than the trailing edge thereof. Gauld, U.S. Pat. No. 4,374,728 discloses a fibrous stock screening apparatus including means for allowing untreated stock to be added at points deep within the screening zone thereof to maintain a proper water to fiber ration throughout the screening zone. Gauld, U.S. Pat. No. 4,462,901 discloses a fibrous stock screening apparatus including a preliminary screen and a secondary screen for providing a course screening step and a fine screening step. None of the above patents disclose or suggest the present invention.

SUMMARY OF THE INVENTION

The present invention is directed toward improving upon prior rotor, blade, screen and knotter design in fibrous stock screening apparatus for separating various size debris from a pulp slurry under pressure.

Pressure screens are normally designed with a single inlet port, a single reject port, and a single accepts port similar to Gauld, U.S. Pat. No. 4,234,417. The present invention splits the inlet "feed" port and "rejects" port in such a way as to essentially make two screens in one housing. The intent is to increase the capacity of a given unit while using the same physical size unit and similar horse power while improving the efficiency of debris removal.

In the opinion of the inventor, pressure screen capacity in terms of unit screen plate area decreases as stock to be processed proceeds along the axis of the screen plate. Therefore, a screen designed to obtain the maximum capacity per unit of screen plate area should be short in relationship to the screen plate diameter.

Also, debris to be removed from a pulp slurry collects on the inside of screen plates and moves along the axis of the plate to the reject end with the ratio of debris to acceptable pulp increasing along the axis and subsequently the efficiency decreases along the axis since the amount of debris that passes through the screen plate is a percentage or ratio of the debris in the unscreened slurry. With an intermediate rejects outlet, the distance that the debris travels is shorter and therefore the possibility of being accepted is decreased.

Some or all of the blades can be extended to cause a turbulence and/or oscillating pressure so that an extended screen plate can be used to separate debris from stock as it passes inward from the inlet port to the interior of the screen plate. This prescreened stock is then rescreened in the normal manner or according to the double screen design arrangement explained above.

The initial screening zone would normally be for course screening of debris larger than removed in the second screening zone but need not be limited by this restriction.

The blades may have a profile with a relatively long distance between the leading and trailing edges. The outer face of each blade may be curved or straight. Where the distance between the leading and trailing edges is such that a straight face would intersect the radius of the rotor body, the connecting surface must be curved. With the leading edge located farther from the circumference of the rotor body than the trailing edge, the blade members will cause a shearing action with a relatively long, moderate relief on the trailing edge to create gradual and extended negative pressure.

The fibrous stock screen apparatus of the present invention comprises, in general, a housing member having a substantially hollow interior; screen means located within the interior for dividing the interior into a screened zone and a screening zone; stock inlet means communicating with the screening zone; rejects outlet means communicating with the screening zone; accepts outlet means communicating with the screened zone; and rotor means located at least partially within the interior for facilitating the passage of acceptable stock through the screen means. The apparatus may include dam means located within the screening zone for dividing the screening zone into a first primary screening zone and a second primary screening zone with stock inlet means and rejects outlet means communicating with the first primary screening zone and with supplemental stock inlet means and reject outlet means communicating with the second screening zone. The screen means may include an extended screen plate for dividing the screening zone into an initial screening zone and a primary screening zone with rejects outlet means communicating with each screening zone, and the rotor means may include blade means extending from the secondary screening zone into the initial screening zone to cause a turbulence and/or oscillating pressure adjacent the extended screen plate. The profile of each blade member may be defined by an outer edge, a leading edge and a trailing edge with the leading edge of each blade member being spaced farther from the circumference of the body of the rotor means than the trailing edge thereof and with the distance between the leading edge and the trailing edge of each blade member being at least three times the distance from the circumference of the body to the junction between the leading edge and outer face.

DESCRIPTION OF THE PREFERRED EMBODIMENT

Figure 1:
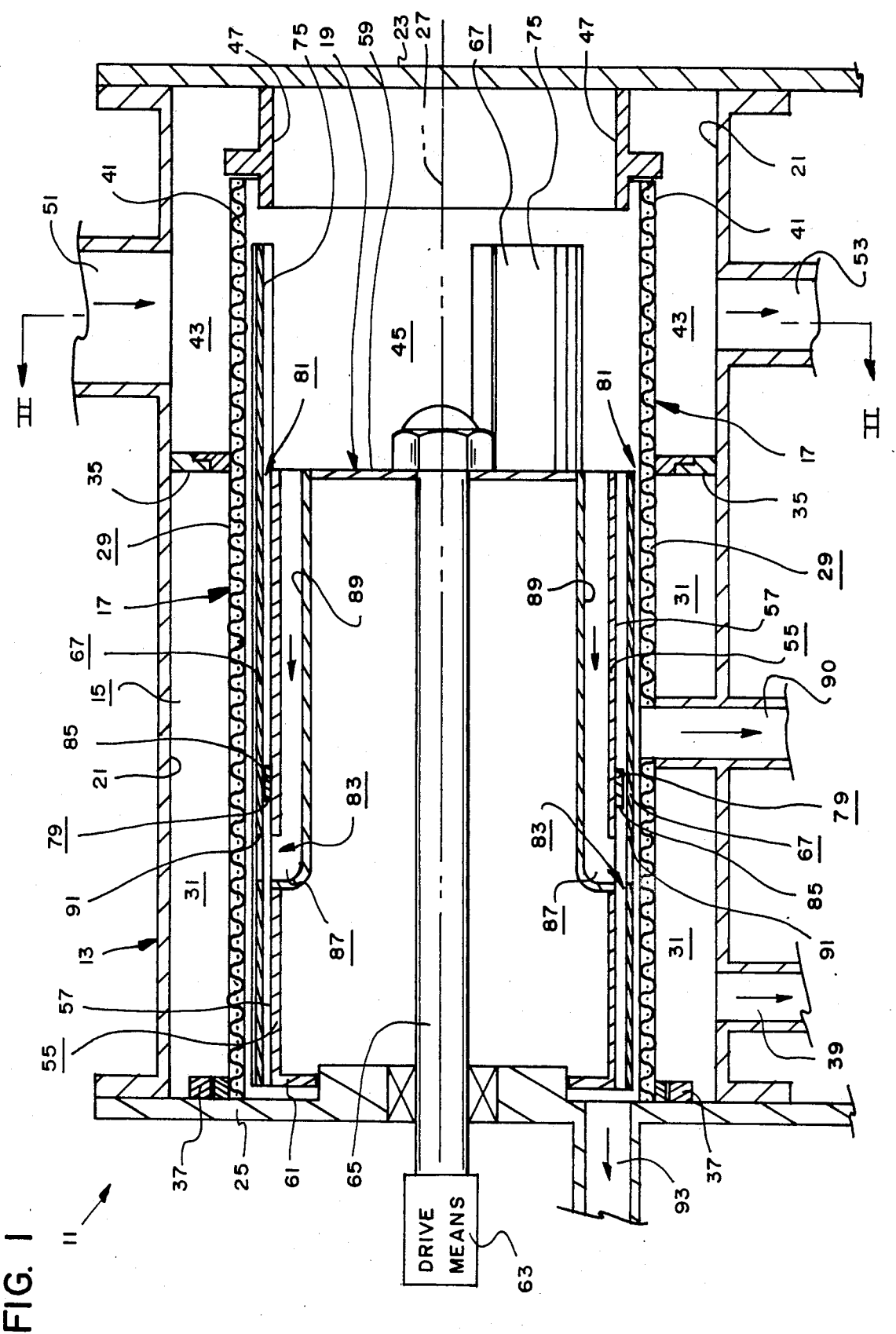
FIG. 1 is a sectional view of the fibrous stock screening apparatus of the present invention.

The fibrous stock screening apparatus 11 of the present invention is used in separating various sized debris from a pulp slurry under pressure. The apparatus 11 includes a housing member 13 having a substantially hollow interior 15; a screen means 17 located within the interior 15; and a rotor means 19 located at least partially within the interior 15 (sec FIG. 1).

The housing member 13 may be constructed out of metal or the like in various specific manners now apparent to those skilled in the art. The interior 15 is defined in part by a preferably circular interior wall 21. The housing member 13 has a first end 23 and a second end 25 with the interior 15 having a longitudinal axis 27 extending between the first and second ends 23, 25 (see FIG. 1).

The screen means 17 preferably includes a cylindrical screen member or plate 29 mounted within the interior 15 in such a manner so as to divide the interior 15 into a screened zone 31 and a screening zone and for allowing acceptable stock to pass therethrough from the screening zone to the screened zone 31. Thus, the screen means 17 may include first structure 35 for coupling the screen member 29 to the interior wall 21 of the housing member 13 at a point between the first and second ends 23, 25 thereof and may include second structure 37 for coupling the screen member 29 to the second end 25 of the housing member 13 in such a manner that the screened zone 31 is defined by the area between the first and second structures 35, 37, the screen member 29 and the interior wall 21 with the screening zone defined by the remainder of the interior 15 (see FIG. 1). An accepts outlet means or port 39 is provided for communicating with the screened zone 31 for allowing acceptable stock which passes through the screen member 29 into the screened zone 31 to exit the interior 15 therethrough. The screen member 29 may include a cylindrical extended portion 41 which extends past the first coupling means 35 toward the first end 23 of the housing member 13 for dividing the screening zone into an initial screening zone 43 located between the extended portion 41 of the screen member 29 and the interior wall 21, and a primary screening zone 45 located within the screen member 29 (see FIG. 1). Structure 47 may be provided substantially between the extended portion 41 of the screen member 29 and the first end 23 of the housing member 13 for coacting with the extended portion 41 of the screen member 29 to substantially close off the initial screening zone 43 and divide the initial screening zone 43 from the primary screening zone 45. The specific construction of the screen member 29 and structures 35, 37, 47 may vary as will now be apparent to those skilled in the art. For example, the screen member 29 may be constructed out of steel plate formed in a substantially rigid cylinder with a plurality of apertures provided therethrough, the size of the apertures determined by the specific screening to be accomplished by the apparatus 11, etc.

An initial or primary stock inlet means or port 51 communicates with the initial screening zone 43 for allowing fibrous stock to be screened to be introduced into the initial screening zone 43. An initial rejects outlet means or port 53 also communicates with the initial screening zone 43 for allowing nonacceptable stock to exit the interior 15.

The rotor means 19 is adapted to contribute to the screening efficiency between the initial and primary screen zones 43, 45 in a manner which will hereinafter become apparent. In general, fibrous stock is introduced into the initial screening zone 43 through the stock inlet means 51 under pressure and the acceptable portions thereof will pass through the extended portion 41 of the screen member 29 into the primary screening zone 45. Nonacceptable stock or debris which does not pass through the extended portion 41 of the screen member 29 will exit the interior 15 through the initial rejects outlet means 53 as will now be apparent to those skilled in the art. Appropriate baffle members or the like (not shown) may be provided within the initial screening zone 43 to help insure that all or most of the acceptable stock will pass through the extended portion 41 of the screen member 29 into the primary screening zone 45.

The rotor means 19 preferably inclues a body member 55 located within the primary screening zone 45. The body member 55 includes a cylindrical wall 57 having a first end 59 and a second end 61. The first end 59 of the wall 57 may be closed. The rotor means 19 includes drive means 63 attached to the body member 55 by way of a shaft 65 or the like for rotating the body member 55 about the longitudinal axis 27.

Figure 3:
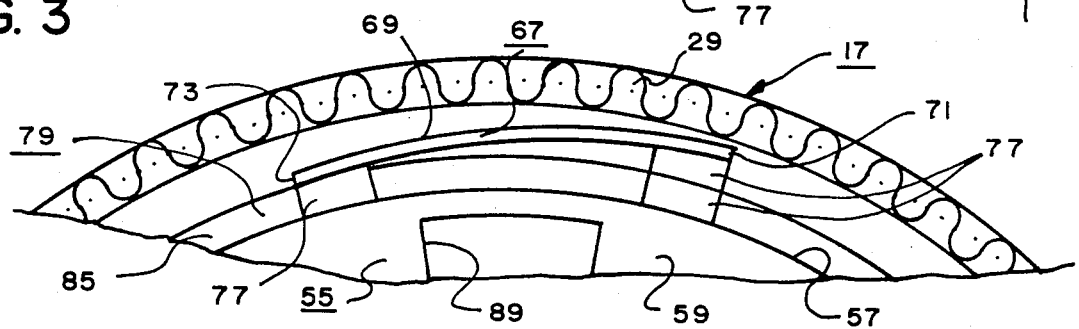
FIG. 3 is an enlarged sectional view of a portion of FIG. 2.

The rotor means 19 preferably includes a plurality of blade members 67 attached to and spaced substantially evenly about the circumference of the body member 55. The blade members 67 extend from the wall 57 of the body member 55 toward the screen member 29 but are spaced a slight distance from the screen member 29 so as to allow a mat of stock to be formed therebetween to allow proper screening to occur as will now be apparent to those skilled in the art. The blade members 67 may be of various cross-sectional shapes such as round, rectangular, foil-shaped, etc. In the embodiment shown in the drawings, each blade member 67 has an outer face 69, a leading edge 71 and a trailing edge 73 (see FIG. 3). The junction of the leading edge 71 and the outer face 69 of each blade member 67 is spaced farther from the circumference of the body member 55 (i.e., from the wall 57) than the junction of the trailing edge 73 and the outer face 69 thereof. The inwardly sloping arrangement of the outer face 69 of each blade member 67 from the leading edge 71 to the trailing edge 73 thereof creates an oscillating pressure with a positive pressure at the leading edge 71 followed by negative pressure near the trailing edge 73 thereby aiding screening and preventing or helping to prevent the screen member 29 from becoming clogged or the like as will now be apparent to those skilled in the art. It is believed that the leading edge 71 produces a shear that lowers the relative viscosity of the pulp slurry and that the sloping edge joining the leading edge 71 and trailing edge 73 produces a gradual negative pressure which prevents or minimizes the clogging effect. The distance between the leading edge 71 and the trailing edge 73 of each blade member 67 is preferably at least three times the distance from the circumference of the body member 55 to the junction of the leading edge 71 and outer face 69 thereof. More specifically, the distance between the leading edge 71 and the trailing edge 73 of each of the blade members 67 may be at least six times the distance from the circumference of the body member 55 to the junction of the leading edge 71 and outer face 69. The distance between the leading edge 71 and trailing edge 73 of each blade member 67 may also be considered in relationship to the circumference of the body member 55. That is, the rotor means 19 may include six blade members 67 spaced symmetrically about the circumference of the body member 55 with the distance between the leading edge 71 and trailing edge 73 of each blade member 67 substantially equal to the distance between adjacent blade members 67. More specifically, the distance between the leading edge 71 and trailing edge 73 of each blade member 67 may be substantially equal to one-twelfth of the circumference of the body member 55. The outer face 69 of each blade member 67 may be curved as shown or may be straight. Where the distance between the leading and trailing edges 71, 73 is such that a straight outer face 69 would intersect the circumference of the body member 55, the outer face 69 must be curved. This profile is used to cause a shearing action with a long, moderate relief at the trailing edge 73 to create gradual and extended negative pressure as will now be apparent to those skilled in the art. That is, the leading edge 71 is believed to produce a shear to minimize the relative viscosity while the sloping edge joining the leading edge 71 and trailing edge 73 allows for a gradual negative pressure along that surface.

Figure 4:
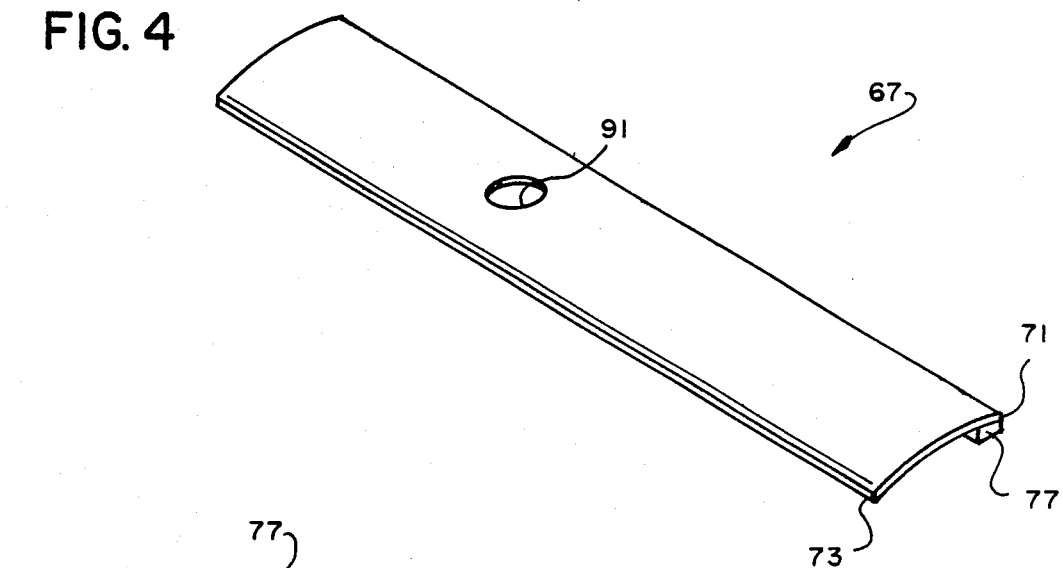
FIG. 4 is a perspective view of one blade member of the fibrous stock screening apparatus of the present invention.
Figure 5:
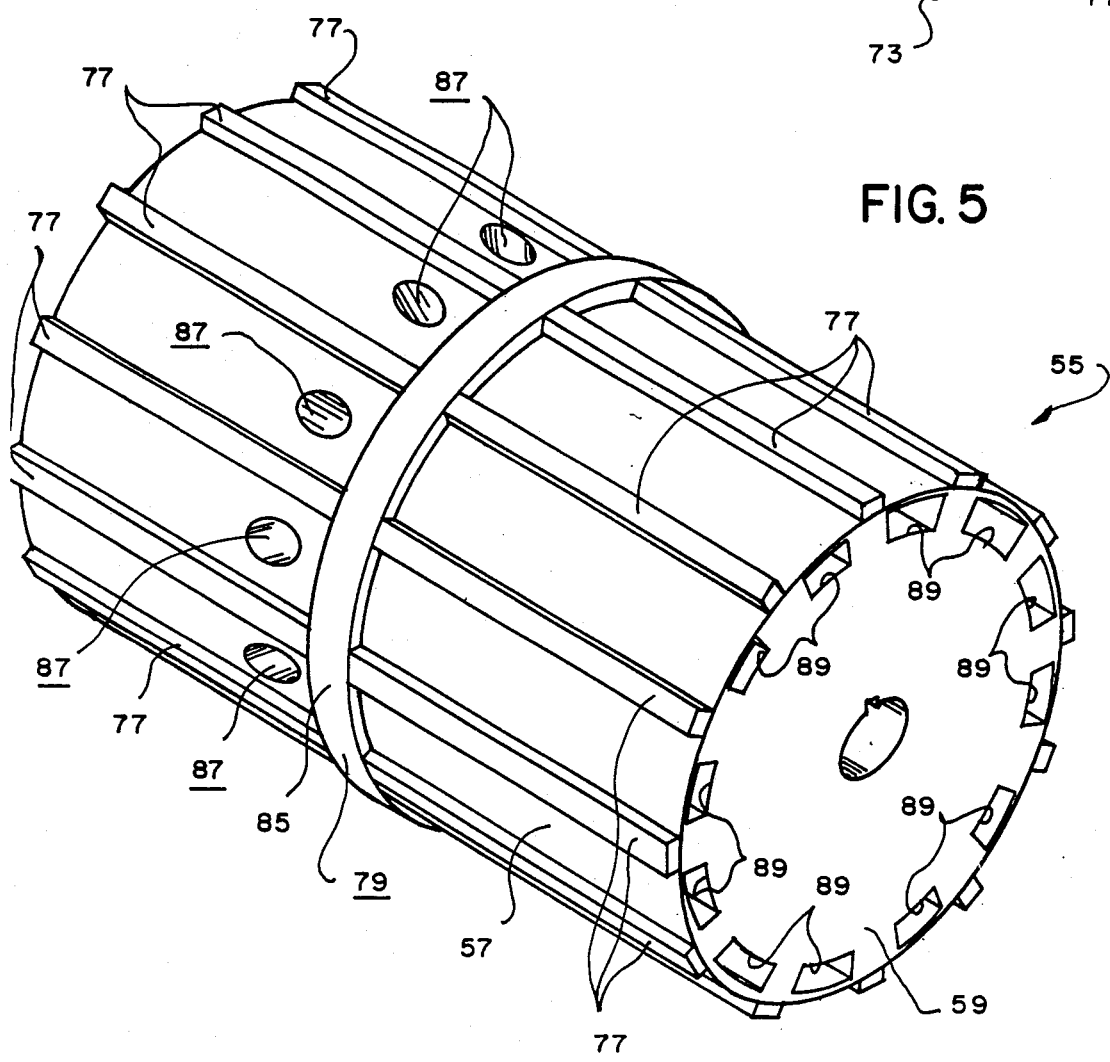
FIG. 5 is a perspective view of the body member of the rotor means of the fibrous stock screening apparatus of the present invention.

One or more of the blade members 67 may have an extended portion 75 for extending past the first end 59 of the wall 57 toward the first end 23 of the housing member 13 for coacting with the extended portion 47 of the screen member 29 to create a turbulence and/or oscillating pressure to facilitate the separation of debris from stock as the stock passes from the initial screening zone 43 through the extended portion 41 of the screen member 29 into the primary screening zone 45. The specific construction of the blade member 67 may vary as will now be apparent to those skilled in the art. Thus, the outer face 69 of each blade member 67 may be removably attached to the wall 57 of the body member 55 through ribs 77 with bolts or the like (not shown). The ribs 77 will thus properly position the outer face 69 of each blade member 67 from the wall 57 of the body member 55. Therefore, the ribs 77 associated with the leading edge 71 of each blade member 67 has a greater thickness than the ribs 77 associated with the trailing edge 73 of each blade member 67. As clearly shown in FIGS. 4 and 5, the ribs 77 associated with the leading edge 71 of each blade member 67 may include a first portion attached to the body member 55 and a second portion attached to the leading edge 71 of a blade member 67.

The apparatus 11 may include dam means 79 located within the primary screening zone 45 for dividing the primary screening zone 45 into a first primary screening zone 81 and a second primary screening zone 83. The dam means 79 may consist of a transverse ring 85 attached to the wall 57 of the body member 55 at a point between the first and second ends 59, 61 thereof and projecting toward the screen member 29. While the dam means 79 need not create a fluid tight division between the first and second primary screening zone 81, 83, it will effectively divide the primary screening zone 45 into the first and second primary screening zones 81, 83 and prevent most of the debris within the first primary screening zone 81 from passing to the second primary screening zone 83, etc.

The stock inlet means 51 communicates with the first primary screening zone 81 through the initial screening zone 43 for allowing fibrous stock to be screened to be introduced into the first primary screening zone 81. A first primary rejects outlet means or port 90 communicates with the first primary screening zone 81 for allowing debris to exit the interior 15. The apparatus 11 preferably includes a supplemental stock inlet means or port 87 communicating with the second primary screening zone 83 for allowing fibrous stock to be screened to be introduced into the second primary screening zone 83. The stock inlet means 87 may be defined by a plurality of passageways 89 formed in the body member 55 and extending from the first end 59 to a point in the wall 57 between the transverse ring 85 and the second end 61 to thereby allow fibrous stock to pass from the first end 59 to the second primary screening zone 83 as will now be apparent to those skilled in the art. Thus, the passageways 89 may be constructed similar to the passageways means 2.11 of Gauld, U.S. Pat. No. 4,374,728, issued Feb. 22, 1983. On the other hand, the first end 59 of the body member 55 of the rotor means 19 may be open and the supplemental stock inlet means 87 may be defined merely by apertures through the body member 55 at a point in the wall 57 between the transverse ring 85 and the second end 61 to thereby allow fibrous stock to pass through the open first end 59 into the interior of the body member 55 and out the stock inlet means 87 to the second primary screening zone 83 as will now be apparent to those skilled in the art. Each blade member 67 may be provided with an aperture 91 through the outer face 69 thereof so as not to block the stock inlet means 87.

A second primary rejects outlet means or port 93 preferably communicates with the second primary screening zone 83 for allowing debris to exit the interior 15.

Figure 2:
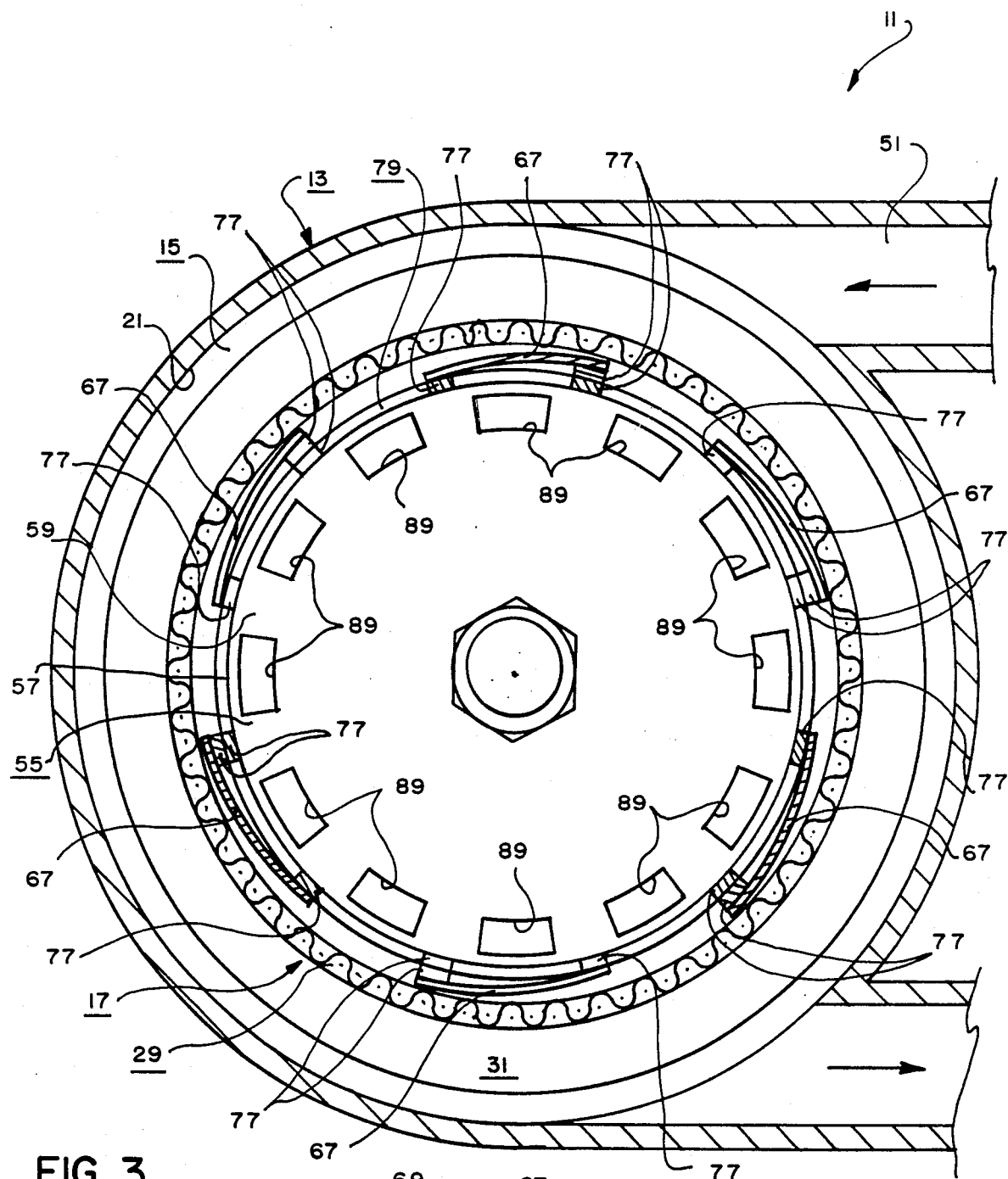
FIG. 2 is a sectional view substantially as taken on line II—II of FIG. 1.

To use the apparatus 11, fibrous stock slurry is fed into the interior 15 of the housing member 13 through the stock inlet means 51 under pressure. The stock will pass through the apparatus 11 in the direction indicated by the arrows in FIGS. 1 and 2. An initial screening step takes place between the initial screening zone 43 and the primary screening zone 45 through the extended portion 41 of the screen member 29 with the extended portions 75 of the blade members 67 creating a turbulence and/or oscillating pressure to thereby separate debris from stock passing through the extended portions 41 of the screen member 29. Debris not passing through the extended portion 41 of the screen member 29 will exit through the rejects outlet means 53. Stock passing through the extended portion 41 of the screen member 29 into the primary screening zone 45 will either pass between the wall 57 of the body member 55 and the screen member 29 into the first primary screening zone 81 or through the passageways 89 and stock inlet means 87 into the second primary screening zone 83 as will now be apparent to those of ordinary skill in the art. Acceptable stock in the first and second primary screening zones 81, 83 will pass through the screen member 29 into the screened zone 31 and out the accepts outlet means 39. Debris in the first and second primary screening zones 81, 83 will pass out the appropriate rejects outlets means 90, 93.

The specific construction and operation of the apparatus 11 may vary as will now be apparent to those of ordinary skill in the art. The apparatus 11 may include typical features such as dilution shower means, etc. (not shown) as will now be apparent to those of ordinary skill in the art. While the feature of the apparatus 11 that are common with prior art fibrous stock screening apparatus have been shown and described in a substantially diagrammatic fashion, it will now be apparent to those of ordinary skill in the art that the unique features of the apparatus 11 may be incorporated into various prior art fibrous stock screening apparatuses.

Although the invention has been described and illustrated with respect to a preferred embodiment thereof and a preferred use therefore, it is not to be so limited since changes and modifications may be made therein which are within the full intended scope of the invention.

I claim:

1. A fibrous stock screening apparatus comprising:
   (a) a housing member having a substantially hollow interior;
   (b) screen means located within said interior for dividing said interior into a screened zone and a screening zone and for allowing acceptable stock to pass therethrough from said screening zone to said screened zone, said screen means including a cylindrical screen member;
   (c) rotor means located at least partially within said screening zone for causing acceptable fibrous stock within said screening zone to pass through said screen means into said screened zone, said rotor means including a cylindrical body member having a first end and a second end;
   (d) dam means located within said screening zone for dividing said screening zone into a first screening zone and a second screening zone, said dam means including a transverse ring member positioned between said screen member and said body member intermediate said first and second ends of said body member;
   (e) first stock inlet means communicating with said first screening zone for allowing fibrous stock to be screened to be introduced into said first screening zone;
   (f) first rejects outlet means communicating with said first screening zone for allowing debris to exit said interior;
   (g) second stock inlet means communicating with said second screening zone for allowing fibrous stock to be screened to be introduced into said second screening zone;
   (h) second rejects outlet means communicating with said second screening zone for allowing debris to exit said interior; and
   (i) accepts outlet means communicating with said screened zone for allowing acceptable stock to exit said interior.

2. The apparatus of claim 1 in which said ring member is attached to said body member and extends outward from said body member toward said screen member.

3. The apparatus of claim 2 in which said rotor means includes a plurality of blade members attached to said body member and extending between said first and second ends of said body member on either side of said ring member.

4. A fibrous stock screening apparatus comprising:
   (a) a housing member having a substantially hollow interior defined in part by a first end and a second end;
   (b) screen means located within said interior for dividing said interior into an annular initial screening zone located adjacent said first end of said housing member, an annular screened zone located adjacent said second end of said housing member in a non-overlapping relationship with said initial screening zone, and a primary screening zone located within said initial screening zone and said screened zone and for allowing acceptable stock to pass therethrough from said initial screening zone to said primary screening zone and then to said screened zone;
   (c) stock inlet means communicating with said initial screening zone for allowing fibrous stock to be introduced into said initial screening zone;
   (d) first rejects outlet means communicating with said initial screening zone for allowing debris to exit said interior;
   (e) second rejects outlet means communicating with said primary screening zone for allowing debis to exit said interior;
   (f) accepts outlet means communicating with said screened zone for allowing acceptable stock to exit said interior;
   (g) rotor means located at least partially within said interior for facilitating the passage of acceptable stock through said screen means; said rotor means including a body member located within said primary screening zone and extending from said second end of said housing member to a point adjacent the end of said screened zone opposite said second end of said housing in a substantially non-overlapping relationship with said initial screening zone, said body member having a first end and having a second end positioned adjacent said second end of said housing member; said rotor means including a plurality of blade members attached to said body member extending from said second end of said body member past said first end of said body member and into an overlapping relationship with said initial screening zone; said rotor means including drive means for causing said body member and said blade members to rotate.

5. A fibrous stock screening apparatus comprising:
   (a) a housing member having a substantially hollow interior;
   (b) screen means located within said interior for dividing said interior into a screened zone and a screening zone and for allowing acceptable stock to pass therethrough from said screening zone to said screened zone, said screen means including a cylindrical screen member;
   (c) stock inlet means communicating with said screening zone for allowing fibrous stock to be introduced into said screening zone;
   (d) rejects outlet means communicating with said screening zone for allowing debris to exit said interior;
   (e) accepts outlet means communicating with said screened zone for allowing acceptable stock to exit said interior; and
   (f) rotor means located at least partially within said interior for facilitating the passage of acceptable stock through said screen means, said rotor means including a cylindrical body member located within said screening zone adjacent and substantially along the longitudinal axis of said screen member, said body member including a substantially solid cylindrical wall, said rotor means including a plurality of blade members attached to the circumference of said body member, each of said blade members having an outer face, a leading edge and a trailing edge; the junction of said leading edge and said outer face of each of said blade members being spaced farther from the circumference of said body member than the junction of said trailing edge and said outer face thereof, the distance between said leading edge and said trailing edge of each of said blade members being at least three times the distance from the circumference of said body member to the junction of said leading edge and said outer face, said cylindrical wall of said body member being parallel to said screen member and extending the entire length of said screened zone and spaced from said screen member a distance no more than one-third the distance between said leading edge and said trailing edge of each of said blade members.

6. The apparatus of claim 5 in which said blade members are spaced symmetrically about the circumference of said body member with the distance between said leading edge and said trailing edge of each blade member substantially equal to the distance between adjacent ones of said blade members.

7. The apparatus of claim 5 in which the distance between said leading edge and said trailing edge of each of said blade members is substantially equal to one-twelfth of said circumference of said body member.

* * * * *